Dec. 30, 1958 W. M. HOULDSWORTH 2,866,421
HORIZONTAL PIE CRIMPER
Filed Aug. 26, 1952
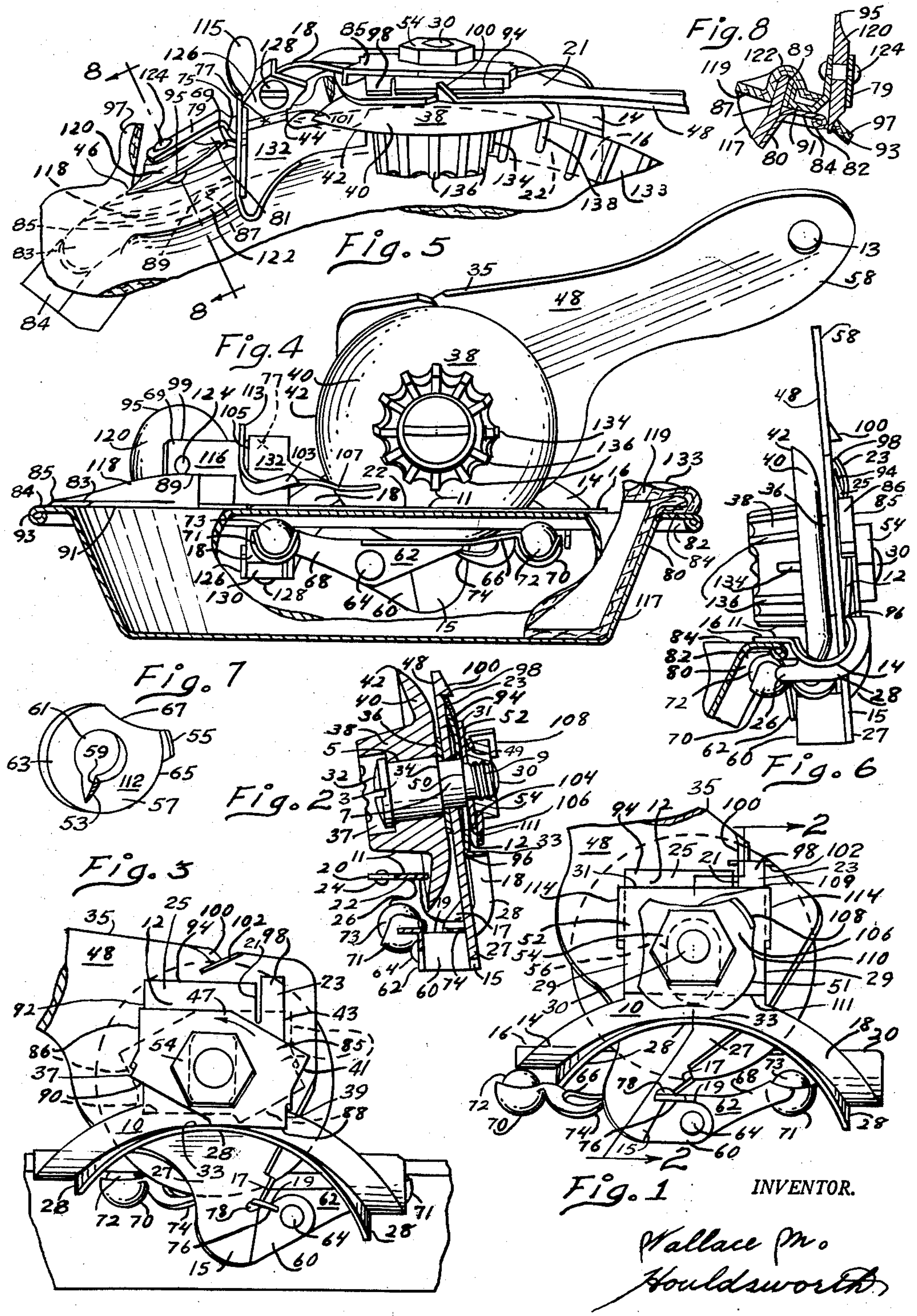

United States Patent Office 2,866,421 Patented Dec. 30, 1958

2,866,421

HORIZONTAL PIE CRIMPER

Wallace M. Houldsworth, Royal Oak, Mich.

Application August 26, 1952, Serial No. 306,439

26 Claims. (Cl. 107—49)

This invention relates generally to an implement or utensil for trimming and crimping pie crust and includes improved variations of similar implements shown and described in my copending applications for United States patents, namely, Serial Numbers 306,436 and 306,437, both having the same filing date, as the present invention, namely August 26, 1952.

An important object of this invention is to provide an implement which can be engaged with the rim of the pie pan, in a manner which eliminates the possibility of same from becoming disengaged during the trimming and crimping operation.

Another important object of this invention is to provide an implement which will crimp or seal together the trimmed overlying outer edges of the pie crust into a horizontal formation between two moving elements of the implement instead of against the pie pan rim, thus cutting to a minimum the adherence of the pie crust to the rim of the pie pan.

It is also an object of this invention to permit optional use of the implement with the Pie-Mole, shown and described in the aforesaid copending application, Serial Number 306,437.

Fig. 1 is a view of the outer side of an implement constructed in accordance with this invention, without a portion of the handle.

Fig. 2 is a cross-sectional view taken along line 2—2 of Fig. 1.

Fig. 3 is a view of the outer side of a modified form of the implement as shown in Fig. 1, and as it appears when mounted on the rim of a pie pan, without a portion of the handle.

Fig. 4 is a view of the inner side of the implement with the Pie-Mole attached, shown as it appears when mounted on the rim of a pie plate, a portion of the pan being cut away to show the undercarriage of the implement in operative position.

Fig. 5 is a plain view of Fig. 4 without the outer end of the handle, showing the effect of the implement upon the pie crust.

Fig. 6 is an elevation of the implement as seen from the right hand side of Fig. 4 without the Pie-Mole attached.

Fig. 7 is a perspective view of a modified form of the rotatable stop plate, for controlling the depth that the crust edges will be indented during crimping.

Fig. 8 is a cross-sectional view taken on the line 8—8 of Fig. 5.

Referring to the drawings and particularly to Figs. 1 and 2, the embodiment of the invention illustrated therein includes an arcuate fork-shaped frame or supporting member 10 having an upright plate 12 made from material with some resiliency. Integral therewith are the arms 14 and 18 and a curved bearing portion 22. The arm 14 is formed to project rearwardly, downwardly and inwardly as it curves from the upright plate 12 terminating in a flat inner end 16, best shown in Figs. 1, 3 and 6. The arm 18 is formed to project forwardly, downwardly and inwardly as it curves from the upright plate 12 terminating in a flat inner end 20, best shown in Figs. 1, 2 and 3. The arcuate fork-shaped arms curving in opposite directions vertically from the upright plate 12 and curving horizontally in the general direction to that which said plate faces. The inner ends 16 and 20 of said arms are connected together by a curved bearing portion 22 that bears upon the pan rim when the utensil is in use, as shown in Figs. 2 and 4, also broken lines in Fig. 5.

The inner ends 16, 20 and portion 22 may be provided with an inserted rotatable bearing 24, as shown in Fig. 2, said arms each may have a rim guide 26 as shown in Fig. 6. The arms 14 and 18 may have a flange 28 extending from the curved inner edge thereof, for stiffening the arms. The arms and plates can be either formed in one piece or in any other known manner suitable to produce a slidable bracket or frame. The stub shaft 30 is in the form of a shouldered bolt, has a slotted head 32 of larger diameter than its body 3, the portion 3 being of a diameter slightly less than that of the bore 5 in wheel 38 and of a length slightly longer than that of the depth of the bore. A smaller diameter portion 7 on the shaft produces a shoulder 34 and a still smaller diameter portion 9, which is threaded to receive nut 54, produces the shoulder 50. The length of portion 7 is somewhat longer than the combined thickness of washer 36, apertured handle 48 and the upright plate 12, each of which is mounted on the portion 7 in slip-fit relationship. The retainer 52 is apertured to slip-fit portion 9 and is held in place against shoulder 50 by the nut 54.

The wheel 38 is of a conventional type, being apertured at 5 for a free fit on shaft portion 3, having a fluted peripheral surface and being concaved so that its peripheral edge 42 may be used for severing excess crust projecting beyond the pan rim at 44. However, when the pie-mole is attached for joint operation with the crimper the excess crust is severed at 46 by the pie-mole trimmer 120. The crust is evently crimped and sealed as it passes through the space 11 which is created by suspending the wheel in spaced relation above the curved bearing portion 22, as shown in Figs. 2, 4, and 6.

The washer 36 has an aperture that is fitted to a slip fit on the diameter 7 of the shaft, and it is of a diameter to provide side faces to act as a thrust bearing for the wheel 38.

The handle 48 is shown as it would be when blanked and formed from flat sheet metal, having an aperture that is fitted to a slip fit on the diameter 7 of the shaft, and has an outer end 58 projecting rearwardly and contoured to fit the operator's hand. It may also have an aperture 13 for hanging the utensil on the wall as shown in Figs. 2 and 4. The handle is formed to have a portion 15 projecting below the shaft and at an angle from the centerlines of the apertures, said portion 15 projecting downwardly between the arms 14 and 18 of the frame 10.

The portion 15 has a lower portion 60 that is formed to project inwardly and forwardly, below the curved bearing portion 22, to operably carry the undercarriage 62 in spaced relation below said portion 22, as shown in Figs. 1, 2, 3, 4 and 6. The portion 15 has a boss 17 formed to project in spaced relation above the top edge 19 of the lower portion 60 forming a slot 78, as shown in Figs. 1, 2 and 3. The slot works in conjunction with the undercarriage and will be described later.

The upright plate 12 is formed to have a concave-convex formation and an elongated vertical aperture 56 of a width to slidably fit the diameter 7 of the shaft 30. The top part of the upright plate has a slot 21 forming a resilient finger 23 and a resilient top portion 25, the resiliency of which is partly due to the concave-convex formation of the plate, the concave surface of which faces in the same general direction as that in which arms 14 and 18 project. Thus the top edges 94 and 98 of the top portion 25 and finger 23 respectively and the lower portion 96 (where the arms 14 and 18 join the upright plate 12) contact the outer surface 27 of the handle, as shown in Figs. 2 and 6.

The retainer 52 is made of flat material and of a size to cover about half of the convex surface of the plate 12, said retainer being apertured and fitted to a slip fit on the threaded end of the shaft adjacent the shoulder 50. A portion of each of the vertical side edges 29—29 of the retainer 52 is flanged inwardly at 90° from the outer surface of the plate and terminates short of abutment with the outer surface 27 of the handle 48. Thus, a pair of spaced flanged retainer edges 114—114 are formed opposite one another and at a width to slidably fit over and along the upright side edges of plate 12 as shown in Figs. 1 and 2.

The top edge 31 of the retainer 52 has no particular function, but the lower edge 111 could act as a stop when contacting the surface 33 of the flange 28 of member 10, if the rotatable notched stop plate 106 is not used, as shown in Figs. 1 and 2. The stop plate 106 will be described later.

The handle 48 has a boss 100 cut and flanged outwardly and an indented groove 102 adjacent the boss, said boss is positioned along the upper edge 35 of the handle and on a desired radius from the center of the shaft so as to contact the end 98 of the finger 23, as best shown in Figs. 1, 2, 3 and 6.

In assembling the utensil, crimping wheel 38 is positioned on the shouldered bolt 30, so that the largest diameter shaft portion 3 is journalled in the bore 5 and the slotted bolt head rests in the wheel recess 37. Next, washer 36, apertured portion 15 of the handle 48 and support plate 12 with its concave face next to the handle are in that order slipped, onto the reduced middle shaft portion 7, so that handle portion 15 lies between the arm portions 14 and 18. Retainer element 52 and nut 54 are then added to the smallest diameter shaft portion 9, (omitting stop plate 106 for the time being) and with a tightening down of the nut 54, the plate 12 is partially flattened so that it is firmly held but permitting slidable movement in its properly aligned position between the flanges 114, 114 of the retainer 52. Finally the undercarriage 62 is pivoted to portion 60 of the handle portion 15 by means of a shouldered rivet 64. A workable form of the utensil is thus completed even though the stop plate 106 is not assembled therewith. It is obvious that the shaft is held at 90° from the upright plate 12 and under resilient pressure, thus the wheel is positioned in spaced relation above the bearing portion 22, and the undercarriage 62 is positioned in spaced relation below said plate. Because the undercarriage must be used with this device, it has been illustrated, and the following is a description thereof.

The undercarriage 62 is an integral unit of spring material, and is pivotally secured by a shouldered pivot 64 to the lower portion 60 of the handle 48, so as to allow a rocking movement therewith. The undercarriage as shown in Fig. 4 has a horizontal arm 66 formed to provide resilient vertical movement, and a vertical arm 68 formed to provide resilient horizontal movement. The ends of the arms extend in opposite directions and may have as shown retainer sockets 70, 71 carrying spherical elements 72, 73 respectively for rotation therein. A resilient leveling finger 74 projects from the horizontal arm 66. The finger 74 terminates in a free end 76, loosely fitted in a slot 78, which is positioned in the lower portion 60 of the handle 48, as shown in Fig. 1, the normal position of the utensil.

As previously stated the inner ends 16, 20 of the arms 14, 16 respectively are connected with the curved bearing portion 22, and in use they bear upon a pan rim. When the device is in the neutral position as shown in Fig. 1, with the handle raised, the undercarriage is in its lowest position. When the inner ends 16, 20 and the curved bearing portion 22 are placed on a pan rim, the undercarriage 62 is automatically disposed beneath said pan rim. Since the handle is pivotally secured on the shaft 30, the lowering of said handle automatically swings the undercarriage 62 forwardly and upwardly, and because of the leveling finger 74 the forward spherical element 73 contacts inside the rolled edge 82 of the pan rim 84 and the pan wall 80 first. Then the pivotal securement of the undercarriage permits the rearward spherical element 72 to contact inside the rolled edge 82 of the pan rim 84 and the pan wall 80, as the resilient leveling finger 74 bends in the process. The undercarriage coming into working position with the pan rim provides means of creating a leverage, and through said leverage and because of the elongated aperture 56 in the upright plate 12 the shaft 30 can be lowered until stopped, by the lower edge 111 of the retainer 52 contacting the top surface 33 of the frame 10. Thus the wheel 38 is automatically lowered to evenly crimp the crust material, as said crust passes between the curved bearing plate 22 and said wheel, while the utensil is propelled upon the pan rim. To dismount the utensil, the process is reversed, but in raising the handle, a part of the boss 100 contacts the top edge 98 of the resilient finger 23, thus creating a fulcrum for automatically raising the wheel. The end 98 of said finger automatically engages the groove 102, so that the utensil is resiliently held in its normal position, as shown in Fig. 1.

A modified retainer plate 85, made in one piece from flat material, of a generally elongated outline and having an aperture located substantially in the center thereof, similar to retainer 52, is shown in Figs. 3 and 6, secured to the shaft 30 by nut 54. Spaced right angle flanges 41 and 86 are disposed on plate 85 along edges 37 and 39 respectively. In the assembled condition of the utensil the flanges 41 and 86 are directed toward the handle 48 but terminate short of the outer surface 27, or as shown in Fig. 6, thus permitting a limited amount of rocking of said retainer plate 85 between the flanges, before the flanges contact portion 27 of the handle.

The flange 86 is disposed adjacent the vertical side edge 92 of the upright plate 12, when a portion of its opposite side edge 39 is parallel with the opposite vertical side edge 43 of said upright plate 12. The retainer plate 85 has a notched lower edge producing two stop edges 88 and 90, the lower edge 88 is formed at approximately 90° from its side edge 39 and is disposed at a desired distance below the shaft 30, to contact the top surface 33 of the flange 28 of the frame member 10 when in operation. As previously stated, the opposite flange 41 of the retainer is formed at an angle from its flange 86, and is disposed at an angle from the side edge 43 of the upright plate 12. The lower edge 90 of said retainer is formed at approximately 90° from its side edge 37, and is disposed at a closer distance below the shaft 30 than the desired distance previously described for the lower edge 88, thus a notched lower edge provides two stop edges 88 and 90. The top edge of the retainer can be any desired shape, but is shown projecting at 90° from the top of the opposite flanges 86 and 41, and terminates in the center at 47. The retainer as shown by the solid lines in Figs. 3 and 6, positions the wheel 38 at a predetermined height above the curved bearing plate 22. The retainer 85 is also shown in broken lines in Fig. 3, and when said retainer is moved in the direction of the arrow, the flange 41 of said retainer will contact the side edge 43 of the upright plate 12, thus disposing the lower edge 90 of said retainer in spaced relation to the top surface 33 of the flange 28. If the handle 48 is lowered, said lower edge 90 will position the wheel 36 at another predetermined height above the curved bearing portion 22.

A modification of the above consists of machining a cylindrical surface on a portion of the inner end of the nut, to form a shoulder 104 to pivotally receive a rotatable stop plate. The rotatable notched stop plate 106 shown in Figs. 1 and 2, may be made into a spherical concavo-convex formation from flat resilient material.

The stop plate 106 has a flanged projection 108 extending from its outer or convexed side for exerting an inward resilient thrust from its concaved or inner side. The stop plate 106 has an aperture 49 fitted for a slip fit on the cylindrical surface of the nut. The plate 106 is also provided with a series of notches, as for example notches 109 and 110 shown in Figs. 1 and 2, which are positioned in the periphery 51 at unlike radial distances from the center of aperture 49.

The rotatable stop plate 106 is pivotally mounted on the cylindrical surface of the nut 54 with its convexed side adjacent the shoulder 104, and after assembling the nut as previously described a resilient thrust is created for frictionally holding said plate. The projection 108 provides means of manually positioning the plate at different heights from which the wheel 36 can be suspended, depending upon which notch is positioned below the shaft for contact with the surface 33 of the flange 28.

Fig. 7 shows a perspective view of a modified rotatable stop plate 112, said plate is made from flat resilient material and formed similar to the rotatable notched plate 106 and is assembled and used in the same manner as said plate 106. The rotatable plate 112 is formed to have a spherical concavo-convexed formation as is illustrated by the curved cross-hatched section 53, as may be seen in Fig. 7. The stop plate 112 is formed with a projection 55 extending from its convexed or outer side 57, and is formed to exert an inward resilient thrust from its concaved or inner side 59. The stop plate 112 has an aperture 61, and is formed to have an inclined contoured peripheral edge 63, said contoured edge has a desired maximum distance at 65 from the aperture 61, and inclines as it curves inward to a desired minimum distance at 67 from said aperture. Wheel 38 can therefore be suspended at various heights within the limits of the eccentricity of peripheral edge 63.

The pie-mole illustrated for use with this utensil as shown in Figs. 4, 5 and 8, consists of several parts forming an integral member or co-member 116 including a bracket element 126, the member 116 and bracket 126 each have upright portions 69 and 75 respectively, said portions are disposed adjacent one another and the X numbered 77 indicates where they may be spot welded together. The portion 75 of the bracket 126 has a forward portion 79, said portion 79 is formed to project forward in offset relation to the upright portion 69 so as to form a slot 81 therebetween. A wheel 120 is pivotally secured within the slot 81 by means of a pivot pin 124, riveted to bracket portion 79. The member 116 has a ridge 118 located forwardly and inwardly in spaced relation from the wheel 120 and the upright portion 69. The forward portion of the member terminates in a flattened point 83, said point being approximately the width of the pan rim 84, as shown in broken lines in Fig. 5. The ridge starts to incline upward at the forward outside edge 85 of the point 83 and extends rearwardly or opposite to the line of travel, to the opposite inside curved edge 87 terminating at its summit 89, to a height approximately equal to the width of the point, the contoured sides of said ridge converge toward the perpendicular while approaching said summit 89, and the curved edge 87, as shown in broken lines in Fig. 5 and in solid lines in Figs. 4 and 8. The member has a flat lower surface 91 that slidably bears upon the pan rim, and the lower part of the wheel and the bracket extend below the tangential plane of the lower surface 91 of the member. The lower part of the bracket 126 is formed to fit over the front arm 18 of the frame member 10, and is shown secured thereto with a screw 128 and a nut 130 in Figs. 4 and 5. When positioned on the pan rim 84, the wheel 120 of the pie-mole is disposed adjacent the outer edge 93 of the pan rim. The perpheral surface of the wheel 120 is machined to terminate in a cutting edge 95. As previously stated, the pie-mole slides upon the pan rim when in operation, and while doing so the point 83 and ridge 118 must slide beneath the crust material, the crust overlying the rim will automatically slide up the forward contoured side of the ridge, while the crust hanging beyond the edge 93 of the pan rim will be raised while projecting outwardly from said ridge 118. The excess crust 97 is severed at 46 as it comes in contact with wheel 120, said wheel rotating while contacting the outer edge 93 of the pan rim, as shown in Figs. 5 and 8. As the process continues the crust draped over the ridge continues to rise until it reaches the summit 89, and as the ridge slides from beneath said draped crust a multi-layer vertical crust edge 122 is formed as shown in Figs. 5 and 8.

To relay the vertical crust edge in a turned under formation a crust guide 132 is secured to the pie-mole. The guide 132 is made from thin resilient material formed into an arched formation to project inwardly and downwardly from the top edge 99 of the upright portion 69. A flanged portion 101 formed to project downward adjacent the upright portion 75 of the bracket 126, is secured thereto by spot welding at the same time as the portions 69 and 75 are welded together, and the X numbered 77 indicates where, as shown in Figs. 4 and 5. The arched formation is suspended inwardly in spaced relation from the upright portion 69 and the tangential plane of the surface 91, and terminates in a flanged point 103. The size of the arch decreases, as it curves rearwardly from its forward edge 105 to where it terminates in a curved spring 107 which horizontally projects rearwardly in a vertically spaced relation to the tangential plane of the bottom surface 91 of the member 116, as shown in Figs. 4 and 5. The guide may have a small lever 113 integral therewith, which projects from the flanged point 103 along the forward edge 105, rests on the top edge 99 of the upright portion 69 before projecting outwardly over the bracket 126 where it terminates in a flattened outer end 115 as shown in Figs. 4 and 5. When the pie-mole is used, the lever 113 provides leverage, when the outer end is depressed, to raise the crust guide. As previously stated the wheel 38 is of a conventional type, but as shown in Fig. 5, the teeth 136 are at uniform intervals, one of said teeth being replaced with a shorter tooth 134, for the purpose of leaving a shorter impression 138, at uniform intervals along the crimped edge of the pie, to indicate the area in which the pie should be cut, so that uniform wedges of the pie may be obtained.

The crimped crust material 133 will appear the same from the top of the pie whether the pie-mole is used or not, but if used the outer edge of the bottom crust layer 117 is trimmed before the top crust 119 is applied. After the top crust is applied the multi-layer vertical crust edge 122 can be formed as the ridge 118 slides beneath the crust material, as previously described and as may be seen in Figs. 5 and 8. As the process continues the vertical crust edge is relaid horizontally as it is pressed beneath the crust guide 132, and as the utensil is propelled its wheel 38 evenly crimps said crust against the curved bearing plate 22, thus producing a multi-layer turned under crust edge 133, as may be seen in Figs. 4 and 5.

In general, there is provided as a result of this invention, an improved pie utensil capable of severing the excess crust material projecting beyond the rim of the pie pan, while evenly crimping and sealing said crust as the utensil is propelled around upon the pan rim. As an optional utensil for manufacturing pies, the Pie- Mole may be secured, as an advance part to a crimping utensil for raising the crust lying over the pan rim, while at the same time severing the excess crust material lying in the path of the cutter 120, so as to produce a multi-layer crust edge in advance of the crimping utensil. The utensils can be sold separately for optional use thereof as desired.

In order to use my utensil, part 16 is inserted beneath the pie crust so that it rests on the rim of the pan, then the handle 58 is depressed which causes the undercarriage to engage the underside of the pan rim. The utensil can then be propelled around the pan rim for trimming and crimping the crust edges.

When the pie-mole is attached to the utensil for combined use therewith, a portion of the pie crust lying along the pan rim is turned back over the pie, so as to provide a cleared pan rim portion for the seating thereon of the combined utensil. The combined utensil is then propelled around the pan-rim, crimping the crust in its path, until the crimped dough appears at the rear of the utensil, whereupon the turned back portion of the crust is restored to its original position on the pan rim. The crimping operation is then resumed and continued, until the entire edge of the crust is crimped.

What I claim is:

1. In a culinary utensil for the purposes described, including a normally balanced undercarriage forming a lower part, and a forward member having a contoured ridge forming an advanced part therewith, an arcuate fork shaped frame with a horizontal bearing portion connecting the lower ends of its side portions, the junction of said side portions terminating in an upright plate projecting in offset relation and facing in the general direction that the side portions extend, the upright plate having an elongated vertical aperture and a stub shaft movably mounted in said aperture, a retainer plate larger than said aperture securely mounted on the shaft adjacent the outside surface of the upright plate, the shaft extending laterally from the upright plate in the general direction of the side portions of the frame and in spaced relation therefrom, a wheel mounted for rotation on the extended end of the shaft, a handle pivotally mounted on said shaft between said wheel and the upright plate, a lower portion of the handle disposed operably through the aperture formed by the formation of the frame, and projecting beneath the bearing portion with the normally balanced undercarriage pivotally secured thereto in spaced relation below said bearing portion, the handle providing co-operative means of vertical movement in relation to the elongated aperture through leverage, the shaft carrying means of positioning the suspended wheel in at least one specific height above the bearing portion, the upright plate providing means of frictional engagement for holding the handle neutrally.

2. In a culinary utensil for the purposes described, including a normally balanced undercarriage forming a lower part therewith, an arcuate fork shaped frame with a horizontal bearing portion connecting the lower ends of its side portions, the junction of said side portions terminating in an upright plate projecting in offset relation and facing in the general direction that the side portions extend, the upright plate having an elongated vertical aperture and a stub shaft movably mounted in said aperture, the shaft extending laterally from the upright plate in the general direction of the side portions of the frame and in spaced relation therefrom, a wheel mounted for rotation on the extended end of the shaft, a handle pivotally mounted on said shaft between said wheel and the upright plate, the handle providing co-operative means of vertical movement in relation to the elongated aperture, a retainer plate larger than said aperture securely mounted on the shaft adjacent the outside surface of the upright plate, said shaft carrying means of positioning the suspended wheel in desired specific heights above the bearing portion, a lower portion of the handle disposed operably through the aperture formed by the formation of the frame, and projecting beneath the bearing portion with the normally balanced undercarriage pivotally secured thereto in spaced relation below said bearing portion, the upright plate having means of frictional engagement for holding the handle neutrally.

3. In a culinary utensil for the purposes described, including a normally balanced undercarriage forming a lower part, and a forward member having a contoured ridge forming an advanced part therewith, an arcuate fork shaped frame with a horizontal bearing portion connecting the lower ends of its side portions, the junction of said side portions terminating in an upright plate projecting in offset relation and facing in the general direction that the side portions extend, the upright plate having an elongated vertical aperture and a stub shaft movably mounted in said aperture, the shaft extending laterally from the upright plate in the general direction of the side portions of the frame and in spaced relation therefrom, a wheel mounted for rotation on the extended end of the shaft, a handle pivotally mounted on said shaft between said wheel and the upright plate, the handle providing co-operative means of vertical movement in relation to the elongated aperture, a retainer plate larger than said aperture securely mounted on the shaft adjacent the outside surface of the upright plate, said shaft carrying means of positioning the suspended wheel in desired specific heights above the bearing portion, a lower portion of the handle disposed operably through the aperture formed by the formation of the frame, and projecting beneath the bearing portion with the normally balanced undercarriage pivotally secured thereto in spaced relation below said bearing portion, the upright plate having means of frictional engagement for holding the handle neutrally, and the frame having means for operably securing said advance part.

4. In a culinary utensil for the purposes described, including a normally balanced undercarriage forming a lower part wherewith, an arcuate fork shaped frame with a horizontal bearing portion connecting the lower ends of its side portions, the junction of said side portions terminating in an upright plate projecting in offset relation and facing in the general direction that the side portion extend, the upright plate having an elongated vertical aperture and a stub shaft movably mounted in said aperture, the shaft extending laterally from the upright plate in the general direction of the side portions of the frame and in spaced relation therefrom, a wheel mounted for rotation on the extended end of the shaft, a handle pivotally mounted on said shaft between said wheel and the upright plate, the handle providing co-operative means of vertical movement in relation to the elongated aperture, the shaft carrying means for operable attachment to said upright plate and for positioning the suspended wheel in at least one specific spaced height above the bearing portion, a lower portion of the handle disposed operatably through the aperture formed by the formation of the frame, and projecting beneath the bearing portion with the normally balanced undercarriage pivotally secured thereto in spaced relation below said bearing portion.

5. In a culinary utensil for the purposes described, including a normally balanced undercarriage forming a lower part therewith, an arcuate fork shaped frame with a horizontal bearing portion connecting the lower ends of its side portions, the junction of said side portions terminating in an upright plate projecting in offset relation and facing in the general direction that the side portions extend, the upright plate having an elongated vertical aperture and a stub shaft movably mounted in said aperture, the shaft extending laterally from the upright plate in the general direction of the side portions of the frame and in spaced relation therefrom, a wheel mounted for rotation on the extended end of the shaft, a handle pivotally mounted on said shaft between said wheel and the upright plate, the handle providing co-operative means of vertical movement in relation to the elongated aperture, said shaft carrying means for operable attachment to said upright plate and for positioning the suspended wheel in desired specific heights above the bearing portion, a lower portion of the handle disposed operably through the aperture formed by the formation of the frame, and projecting beneath the bearing portion with the normally balanced undercarriage pivotally secured thereto in spaced relation below said bearing portion, the upright plate having means of frictional engagement for holding the handle neutrally.

6. In a culinary utensil for the purposes described, including a normally balanced undercarriage forming a lower part therewith, an arcuate fork shaped frame with a horizontal bearing portion connecting the lower ends of its side portions, the junction of said side portions terminating in an upright plate projecting in offset relation and facing in the general direction that the side portions extend, the upright plate having an elongated vertical aperture and a stub shaft movably mounted in said aperture, the shaft extending laterally from the upright plate in the general direction of the side portions of the frame and in spaced relation therefrom, a wheel mounted for rotation on the extended end of the shaft, a handle pivotally mounted on said shaft between said wheel and the upright plate, a lower portion of the handle disposed operably through the aperture formed by the formation of the frame, and projecting beneath the bearing portion with the normally balanced undercarriage pivotally secured thereto in spaced relation below said bearing portion, the handle providing co-operative means of vertical movement in relation to the elongated aperture through leverage, the shaft carrying means for operable attachment to said upright plate and for positioning the suspended wheel in at least one specific height above the bearing position, the upright plate providing means of frictional engagement for holding the handle neutrally.

7. In a culinary utensil for the purposes described, including a normally balanced undercarriage forming a lower part, and a forward member having a contoured ridge forming an advanced part therewith, an arcuate fork shaped frame with a horizontal bearing portion connecting the lower ends of its side portions, the junction of said side portions terminating in an upright plate projecting in offset relation and facing in the general direction that the side portions extend, the upright plate having an elongated vertical aperture and a stub shaft movably mounted in said aperture, the shaft extending laterally from the upright plate in the general direction of the side portions of the frame and in spaced relation therefrom, a wheel mounted for rotation on the extended end of the shaft, a handle pivotally mounted on said shaft between said wheel and the upright plate, a lower portion of the handle disposed operably through the aperture formed by the formation of the frame, and projecting beneath the bearing portion with the normally balanced undercarriage pivotally secured thereto in spaced relation below said bearing portion, the handle providing co-operative means of vertical movement in relation to the elongated aperture through leverage, the shaft carrying means for its operable attachment to said upright plate and for positioning the suspended wheel in at least one specific height above the bearing portion, the upright plate providing means of frictional engagement for holding the handle neutrally, and the frame having means for operably securing said advance part.

8. In a culinary utensil for the purposes described, including a normally balanced undercarriage forming a lower part therewith, an arcuate fork shaped frame with a horizontal bearing portion connecting the lower ends of its side portions, the junction of said side portions terminating in an upright plate projecting in offset relation and facing in the general direction that the side portions extend, the upright plate having an elongated vertical aperture and a stub shaft movably mounted in said aperture, the shaft extending laterally from the upright plate in the general direction of the side portions of the frame and in spaced relation therefrom, a wheel mounted for rotation on the extended end of the shaft, a handle pivotally mounted on said shaft between said wheel and the upright plate, the handle providing co-operative means of vertical movement in relation to the elongated aperture, said shaft carrying means for its operable attachment to said upright plate and for positioning the suspended wheel in desired specific heights above the bearing portion, a lower portion of the handle disposed operably through the aperture formed by the formation of the frame, and projecting beneath the bearing portion with the normally balanced undercarriage pivotally secured thereto in spaced relation below said bearing portion, the upright plate having means of frictional engagement for holding the handle neutrally.

9. In a culinary utensil for the purposes described, including a normally balanced undercarriage forming a lower part, and a forward member having a contoured ridge forming an advanced part therewith, an arcuate fork shaped frame with a horizontal bearing portion connecting the lower ends of its side portions, the junction of said portions terminating in an upright plate projecting in offset relation and facing in the general direction that the side portions extend, the upright plate having an elongated vertical aperture and a stub shaft movably mounted in said aperture, the shaft extending laterally from the upright plate in the general direction of the side portions of the frame and in spaced relation therefrom, a wheel mounted for rotation on the extended end of the shaft, a handle pivotally mounted on said shaft between said wheel and the upright plate, the handle providing co-operative means of vertical movement in relation to the elongated aperture, said shaft carrying means for its operable attachment to said upright plate and for positioning the suspended wheel in desired specific heights above the bearing portion, a lower portion of the handle disposed operably through the aperture formed by the formation of the frame, and projecting beneath the bearing portion with the normally balanced undercarriage pivotally secured thereto in spaced relation below said bearing portion, the upright plate having means of frictional engagement for holding the handle neutrally, and the frame having means for operably securing said advance part.

10. In a culinary utensil for the purposes described, including a normally balanced undercarriage forming a lower part therewith an arcuate fork shaped frame with a horizontal bearing portion connecting the lower ends of its side portions, the junction of said side portions terminating in an upright plate projecting in offset relation and facing in the general direction that the side portions extend, the upright plate having an elongated vertical aperture and a stub shaft movably mounted in said aperture, the shaft extending laterally from the upright plate in the general direction of the side portions of the frame and in spaced relation therefrom, a wheel mounted for rotation on the extended end of the shaft, a handle pivotally mounted on said shaft between said wheel and the upright plate, the handle providing co-operative means of vertical movement in relation to the elongated aperture, a lower portion of the handle disposed operably through the aperture formed by the formation of the frame, and projecting beneath the bearing portion with the normally balanced undercarriage pivotally secured thereto in spaced relation below said bearing portion.

11. In a culinary utensil for the purposes described, including a normally balanced undercarriage forming a lower part therewith an arcuate fork shaped frame with a horizontal bearing portion connecting the lower ends of its side portions, the junction of said side portions terminating in an upright plate projecting in offset relation and facing in the general direction that the side portions extend, the upright plate having an elongated vertical aperture and a stub shaft movably mounted in said aperture, a retainer plate larger than said aperture securely mounted on the shaft adjacent the outside surface of the upright plate, the shaft extending laterally from the upright plate in the general direction of the side portions of the frame and in spaced relation therefrom, a wheel mounted for rotation on the extended end of the shaft, a handle pivotally mounted on said shaft between said wheel and the upright plate, the handle providing co-operative means of vertical movement in relation to the elongated aperture, a lower portion of the handle disposed operably through the aperture formed by the formation of the frame, and projecting beneath the bearing portion with the normally balanced undercarriage pivotally secured thereto in spaced relation below said bearing portion.

12. In a culinary utensil for the purposes described, including a normally balanced undercarriage forming a lower part therewith an arcuate fork shaped frame with a horizontal bearing portion connecting the lower ends of its side portions, the junction of said side portions terminating in an upright plate projecting in offset relation and facing in the general direction that the side portions extend, the upright plate having an elongated vertical aperture and a stub shaft movably mounted in said aperture, the shaft extending laterally from the upright plate in the general direction of the side portions of the frame and in spaced relation therefrom, a wheel mounted for rotation on the extended end of the shaft, a handle pivotally mounted on said shaft between said wheel and the upright plate, the handle providing co-operative means of vertical movement in relation to the elongated aperture, a retainer plate larger than said aperture securely mounted on the shaft adjacent the outside surface of the upright plate, the shaft carrying means of positioning the suspended wheel in at least one specific height above the bearing portion, a lower portion of the handle disposed operably through the aperture formed by the formation of the frame, and projecting beneath the bearing portion with the normally balanced undercarriage pivotally secured thereto in spaced relation below said bearing portion.

13. In a culinary utensil for the purposes described, including a normally balanced undercarriage forming a lower part therewith, an arcuate fork shaped frame with a horizontal bearing portion connecting the lower ends of its side portions, the junction of said side portions terminating in an upright plate projecting in offset relation and facing in the general direction that the side portions extend, the upright plate having an elongated vertical aperture and a stub shaft movably mounted in said aperture, the shaft extending laterally from the upright plate in the general direction of the side portions of the frame and in spaced relation therefrom, a wheel mounted for rotation on the extended end of the shaft, a handle pivotally mounted on said shaft between said wheel and the upright plate, the handle providing co-operative means of vertical movement in relation to the elongated aperture, a retainer plate larger than said aperture securely mounted on the shaft adjacent the outside surface of the upright plate, said shaft carrying means of positioning the suspended wheel in desired specific heights above the bearing portion, a lower portion of the handle disposed operably through the aperture formed by the formation of the frame, and projecting beneath the bearing portion with the normally balanced undercarriage pivotally secured thereto in spaced relation below said bearing portion.

14. In a culinary utensil for the purposes described, including a normally balanced undercarriage forming a lower part therewith, an arcuate fork shaped frame with a horizontal bearing portion connecting the lower ends of its side portions, the junction of said side portions terminating in an upright plate projecting in offset relation and racing in the general direction that the side portions extend, the upright plate having an elongated vertical aperture and a stub shaft movably mounted in said aperture, the shaft extending laterally from the upright plate in the general direction of the side portions of the frame and in spaced relation therefrom, a wheel mounted for rotation on the extended end of the shaft, a handle pivotally mounted on said shaft between said wheel and the upright plate, a lower portion of the handle disposed operably through the aperture formed by the formation of the frame, and projecting beneath the bearing portion with the normally balanced undercarriage pivotally secured thereto in spaced relation below said bearing portion, the handle providing co-operative means of vertical movement in relation to the elongated aperture through leverage, the shaft carrying means of positioning the suspended wheel in at least one specific height above the bearing portion, the upright plate providing means of frictional engagement for holding the handle neutrally, and the frame having means for operably securing an advance utensil.

15. In a culinary utensil for the purposes described, comprising, an arcuate fork shaped frame with its wide portions extending in a general like direction to one another, which designates the innerside of the utensil, the inner-ends of the side portions connected with a horizontal bearing portion, the junction of said side portions being outwardly and upwardly disposed from the bearing portion and terminating in an upright plate, the upright plate facing inwardly and having an elongated aperture, a shaft disposed in said aperture and carrying securement means to operably secure said shaft so as to be extended at right-angles to the inner side of the upright plate, a wheel mounted for rotation on the inner-end of the shaft disposed in spaced relation above the bearing portion of the frame, a handle mounted on the shaft and provided with pivotal friction means co-operable with the upright plate, so as to vertically carry said shaft and all parts mounted thereon in respect to said upright plate of the frame, the handle having a lower portion with support means to operably secure an undercarriage aligning device in spaced relation beneath the bearing portion of the frame.

16. The utensil of claim 15 in which the securement means includes, a retainer plate larger than the elongated aperture of the upright plate, said retainer plate secured to the outer end of the shaft so as to enable vertical movement therewith, whereby, through said movement the bottom edge of the retainer plate provides means for positioning the wheel in at least one predetermined height above the bearing portion of the frame.

17. The utensil of claim 15 in which the securement means, includes, a rotatable plate larger than the elongated aperture of the upright plate, said rotatable plate secured to the outer end of the shaft so as to enable vertical movement therewith, said rotatable plate having a notched diametrical edge and means for positioning the wheel in at least one predetermined height above the bearing portion of the frame.

18. The utensil of claim 15 in which the securement means, includes, a rotatable plate larger than the elongated aperture of the upright plate, said rotatable plate secured to the outer end of the shaft allowing vertical means enabling therewith, said rotatable plate having diametrical means enabling the wheel to be positioned in any desired height within a predetermined range above the bearing portion of the frame.

19. The utensil of claim 15 in which the securement means, includes, a retainer plate larger than the elongated aperture of the upright plate, the retainer plate and a rotatable plate disposed adjacent to one another and secured on the outer end of the shaft, the rotatable plate frictionally held against self rotation and having means for positioning the wheel in at least one predetermined height above the bearing portion of the frame.

20. The utensil of claim 15 in which the securement means, includes, a retainer plate larger than the elongated aperture of the upright plate, the retainer plate and a rotatable plate disposed adjacent to one another and secured on the outer end of the shaft, the rotatable plate frictionally held against self rotation and having means for positioning the wheel in any desired height within a predetermined range above the bearing portion of the frame.

21. In a culinary utensil for the purposes described, comprising, an arcuate fork shaped frame with its side portions extending in a general like direction to one another, the ends of said side portions connected with a horizontal bearing portion, and the junction of the side portions being outwardly and upwardly disposed from the bearing portion, and terminating in an upright plate, the upright plate facing in the general direction to that which the side portions extend, which designates the inner-side of the utensil, the upright plate having an elongated vertical aperture and a shaft carrying securement means to operably secure said shaft positioned in said aperture, so as to support said shaft at right angles to the inner-side of the upright plate, a wheel mounted for rotation on the extended end of the shaft disposed in spaced relation above the bearing portion of the frame, a handle pivotally mounted on said shaft between said wheel and the upright plate, the handle having contact means providing vertical movement in relation to the elongated aperture, said handle having a lower portion with support means to operably secure an undercarriage aligning device in spaced relation beneath the bearing portion of the frame, the handle having an outwardly projecting portion which designates the rear end of this utensil, the front side portion of the frame having means for attaching an advance co-member for use therewith.

22. The utensil of claim 21 in which the securement means, includes, a retainer plate larger than the elongated aperture and disposed on the shaft adjacent the outerside of the upright plate, and is operably secured thereto so as to enable vertical movement therewith, the lower portion of said retainer plate having means which enables disposing the wheel in at least one predetermined height above the bearing portion of the frame.

23. The utensil of claim 21 in which the securement means, includes, a rotatable plate larger than the elongated aperture and operably secured on the outer end of the shaft, so as to enable vertical movement but being frictionally held against self rotation, the diametrical edge of the rotatable plate being notched and having means for positioning the wheel in at least one predetermined height above the bearing portion of the frame.

24. The utensil of claim 21 in which the securement means, includes, a rotatable plate larger than the elongated aperture and operably secured on the outer end of the shaft, to hold said rotatable plate frictionally against self rotation but enabling vertical movement therewith, the diametrical edge of the rotatable plate having means to dispose the wheel in any desired height within a predetermined range above the bearing portion of the frame.

25. The utensil of claim 21 in which the securement means, includes, a retainer plate larger than the elongated aperture and a rotatable plate operably mounted respectively on the outer end of the shaft and secured thereto, so as to enable vertical movement with the rotatable plate being frictionally held against self rotation and having diametrical locating means, which enables positioning the wheel in at least one predetermined height above the bearing portion of the frame.

26. The utensil of claim 21 in which the securement means, includes, a retainer plate larger than the elongated aperture and a rotatable plate operably mounted respectively on the outer end of the shaft and secured thereto, enabling vertical movement while the rotatable plate is frictionally held against self rotation and having locating means, which enables positioning the wheel in any desired height within a predetermined range above the bearing portion of the frame.

References Cited in the file of this patent

UNITED STATES PATENTS

| | | |
|---|---|---|
| 508,077 | Anderson | Nov. 7, 1893 |
| 820,553 | Clem | May 15, 1906 |
| 860,641 | Croxford | July 23, 1907 |